(12) United States Patent
Lee et al.

(10) Patent No.: US 9,140,866 B2
(45) Date of Patent: Sep. 22, 2015

(54) OPTICAL COMPONENT ARRAYS IN OPTICAL CONNECTORS

(71) Applicant: FINISAR CORPORATION, Sunnyvale, CA (US)

(72) Inventors: David Lee, San Jose, CA (US); Daniel Kossowski, Santa Clara, CA (US); Frank J. Flens, Campbell, CA (US); William H. Wang, Pleasanton, CA (US); Michael Joseph McReynolds, Jr., San Mateo, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 22 days.

(21) Appl. No.: 14/095,820

(22) Filed: Dec. 3, 2013

(65) Prior Publication Data
US 2014/0153866 A1    Jun. 5, 2014

Related U.S. Application Data

(60) Provisional application No. 61/732,868, filed on Dec. 3, 2012, provisional application No. 61/732,861, filed on Dec. 3, 2012, provisional application No. 61/732,886, filed on Dec. 3, 2012.

(51) Int. Cl.
| | |
|---|---|
| *G02B 6/42* | (2006.01) |
| *G02B 6/12* | (2006.01) |
| *G02B 6/43* | (2006.01) |
| *H01R 13/6471* | (2011.01) |

(52) U.S. Cl.
CPC .............. *G02B 6/43* (2013.01); *G02B 6/12004* (2013.01); *G02B 6/4284* (2013.01); *H01R 13/6471* (2013.01); *G02B 6/4206* (2013.01); *G02B 6/4214* (2013.01); *G02B 6/4269* (2013.01)

(58) Field of Classification Search
CPC .... G02B 6/428; G02B 6/4249; G02B 6/4284; G02B 6/4214; G02B 6/4261; G02B 6/4204; G02B 6/43; G02B 6/12004; H01R 13/6471
See application file for complete search history.

(56) References Cited

U.S. PATENT DOCUMENTS

| | | | | |
|---|---|---|---|---|
| 7,063,467 | B2 * | 6/2006 | Nagasaka et al. | 385/88 |
| 7,118,293 | B2 * | 10/2006 | Nagasaka et al. | 385/89 |
| 7,198,416 | B2 * | 4/2007 | Ray et al. | 385/93 |
| 7,369,328 | B2 * | 5/2008 | Yamamoto et al. | 359/726 |
| 7,399,125 | B1 * | 7/2008 | Whaley et al. | 385/92 |
| 8,165,432 | B2 * | 4/2012 | Ohta et al. | 385/15 |
| 8,262,297 | B2 * | 9/2012 | Castagna et al. | 385/90 |
| 8,277,129 | B2 * | 10/2012 | Sabano et al. | 385/83 |

(Continued)

FOREIGN PATENT DOCUMENTS

WO    WO 2013/101112    *    7/2013    .............. G02B 6/38

*Primary Examiner* — Rhonda Peace
(74) *Attorney, Agent, or Firm* — Maschoff Brennan (57) ABSTRACT

An example embodiment includes an optical connector. The optical connector includes a printed circuit board (PCB), multiple optical components, multiple optical fibers, and a lens assembly. The optical components are mounted to the PCB. Additionally, each of the optical components includes an aperture. The lens assembly is positioned on the PCB. The lens assembly defines a cavity in which the optical components are positioned. Additionally, the lens assembly defines optical fiber seats that are configured to receive the optical fibers. The lens assembly includes an angled surface that is configured to reflect optical signals between the optical components and the optical fibers.

20 Claims, 6 Drawing Sheets

(56) References Cited

U.S. PATENT DOCUMENTS

| | | | |
|---|---|---|---|
| 8,641,296 B2* | 2/2014 | Nishimura | 385/92 |
| 8,676,006 B2* | 3/2014 | Morioka | 385/33 |
| 8,923,670 B2* | 12/2014 | Zbinden et al. | 385/33 |
| 2011/0123151 A1* | 5/2011 | Zbinden et al. | 385/33 |
| 2013/0161495 A1* | 6/2013 | Lin | 250/227.11 |
| 2013/0266262 A1* | 10/2013 | Nishimura et al. | 385/35 |
| 2013/0266274 A1* | 10/2013 | Little et al. | 385/89 |
| 2014/0153866 A1* | 6/2014 | Lee et al. | 385/14 |
| 2014/0153881 A1* | 6/2014 | Liff et al. | 385/89 |
| 2014/0178014 A1* | 6/2014 | Flens et al. | 385/88 |
| 2014/0185995 A1* | 7/2014 | Lee et al. | 385/93 |

* cited by examiner

OPTICAL COMPONENT ARRAYS IN OPTICAL CONNECTORS

CROSS-REFERENCE TO RELATED APPLICATIONS

This patent application claims the benefit of and priority to U.S. Provisional Patent Applications Nos. 61/732,868; 61/732,861; and 61/732,886 filed Dec. 3, 2012, which are incorporated herein by reference in their entireties.

FIELD

Embodiments described herein relate generally to optical connectors. More particularly, some example embodiments relate to optical component arrays in optical connectors.

BACKGROUND

An optical cable may be implemented in applications in which data is communicated between host systems. For example, a first host system may transmit data to a second host system via the optical cable. Optical connectors may be attached to one or more of the ends of the optical cable to provide a mechanical coupling between the optical cable and one of the host systems.

To effectively communicate optical signals, components included in the optical connectors are sometimes aligned following construction of the optical connector. In the alignment process, there may be a trade-off between quality of the components and the precision with which the components are positioned relative to one another. For example, increasing the quality of an optical transmitter may allow an optical fiber to be more crudely positioned relative to the optical transmitter. The positioning of components and inclusion of high-quality components may impose significant expenses to the manufacturing of optical connectors.

Additionally, dimensions of optical connectors are decreasing while data rates at which data is communicated via the optical connectors are increasing. Thus, the ability to design an optical connector with some alignment tolerance while manufacturing economically viable optical connectors is becoming increasingly difficult.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF SOME EXAMPLE EMBODIMENTS

An example embodiment includes an optical connector. The optical connector includes a printed circuit board (PCB), multiple optical components, multiple optical fibers, and a lens assembly. The optical components are mounted to the PCB. Additionally, each of the optical components includes an aperture. The lens assembly is positioned on the PCB. The lens assembly defines a cavity in which the optical components are positioned. Additionally, the lens assembly defines optical fiber seats that are configured to receive the optical fibers. The lens assembly includes an angled surface that is configured to reflect optical signals between the optical components and the optical fibers.

Another example embodiment includes a lens assembly. The lens assembly includes a lens body and an angled surface. The lens body defines a cavity and an optical fiber seat. The cavity is configured to have positioned therein an optical component. The optical fiber seat is configured to receive an optical fiber. The angled surface is configured to redirect optical signals from the optical component positioned in the cavity to the optical fiber received in the optical fiber seat or to redirect optical signals from the optical fiber received in the optical fiber seat to the optical component positioned in the cavity.

Another example embodiment includes an optical connector. The optical connector includes a PCB, one or more single channel vertical-cavity surface-emitting lasers (VCSELs), one or more PIN diodes, and a lens assembly. The VCSELs are mounted to the PCB. Each of the VCSELs is configured to transmit optical signals through an aperture. The PIN diodes are mounted to the PCB. Each of the PIN diodes is configured to receive optical signals through an aperture. The lens assembly is positioned on the PCB. The lens assembly defines a cavity in which the VCSELs and the PIN diodes are positioned. The lens assembly defines an optical fiber seat that is configured to receive one or more optical fibers. The lens assembly includes an angled surface that is configured to reflect the optical signals transmitted by the VCSELs to a first subset of the optical fibers received in the optical fiber seat and to reflect optical signals communicated along a second subset of the optical fibers received in the optical fiber seat to the PIN diodes.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only some embodiments of the invention and are therefore not to be considered limiting of its scope. The invention will be described and explained with additional specificity and detail through the use of the accompanying drawings in which.

DETAILED DESCRIPTION OF THE SOME EXAMPLE EMBODIMENTS

An example embodiment includes an optical connector (connector) including a lens assembly. The lens assembly may be positioned on a printed circuit board (PCB). The lens assembly includes an angled surface that is configured to reflect optical signals. Optical fibers extend into the lens assembly. The ends of the optical fibers are substantially aligned with respect to one another. Vertical-cavity surface-emitting lasers (VCSELs) are mounted to the PCB and positioned within a cavity defined by the lens assembly. Each of the VCSELs includes an aperture through which optical signals travel. The VCSELs are rotationally oriented at about 45 degrees with respect to one another and are arranged such that the apertures are substantially aligned.

Figure 1A:
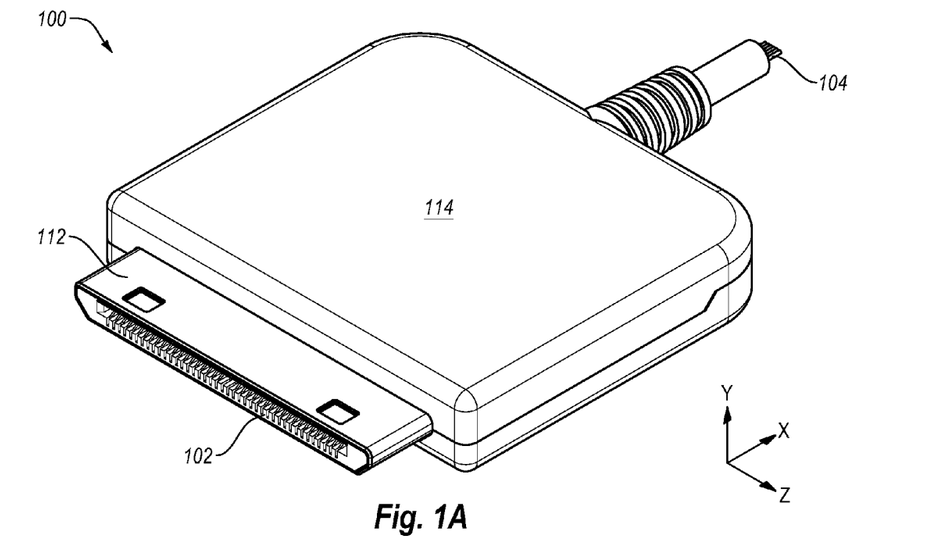
FIGS. 1A and 1B illustrate an example optical connector in which some embodiments disclosed herein may be implemented.
Figure 1B:
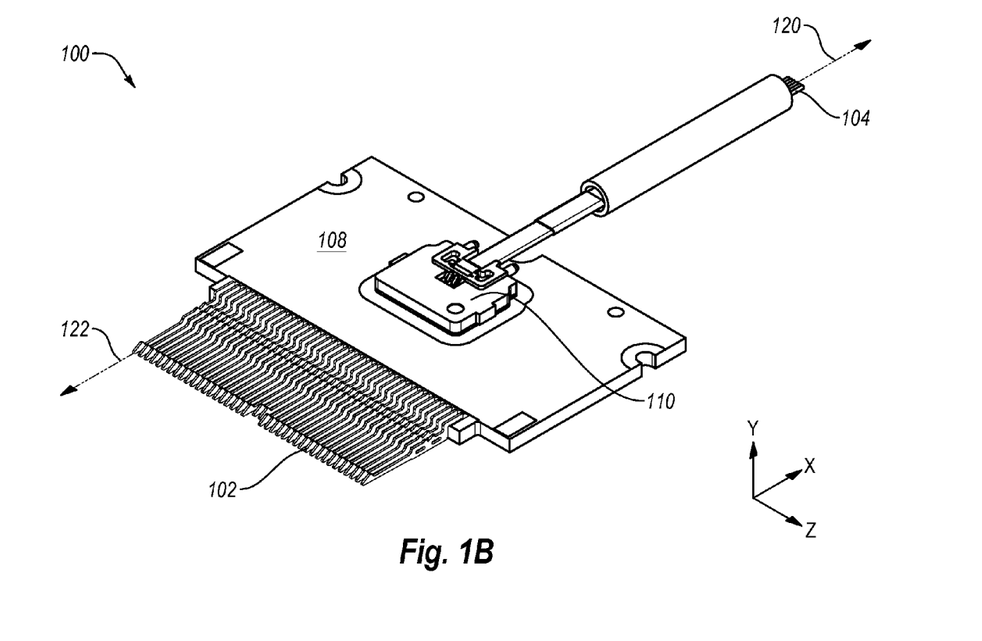

FIGS. 1A and 1B illustrate an example connector 100. FIG. 1A depicts an external view of the connector 100, while FIG. 1B depicts the connector 100 with a connector housing 114 removed. With the connector housing 114 removed, some internal components (e.g., 110 and 108) of the connector 100 may be visible.

Generally, the connector 100 is configured to receive, convert, and communicate high-speed data (e.g., 10 gigabits/second per channel) between a set of pins (pins) 102 and a set of optical fibers (optical fiber) 104. The pins 102 may be composed of an electrically conductive material and may be configured to receive data in the form of electrical signals. The pins 102 may communicate the electrical signals to a PCB 108 (FIG. 1B only). The PCB 108 may include one or more contacts (not shown) and/or one or more electrical traces (not shown) that electrically couple the pins 102 to optical components (not shown) positioned within a lens assembly 110 (FIG. 1B only). The optical components may receive the electrical signals, convert the electrical signals to the optical signals representative of the electrical signals, and transmit the optical signals to the optical fibers 104. The optical components used to receive the electrical signals and/or convert the electrical signals to optical signals may include, but are not limited to, optical transmitters such as a VCSEL, a control module, an optical driver, some combination thereof, or another component configured to receive electrical data signals and/or generate representative optical signals therefrom.

Additionally, the connector 100 may be configured to receive data in the form of optical signals. The optical signals may be communicated along the optical fibers 104. The optical signals may be communicated to one or more optical components positioned within the lens assembly 110. The optical components may convert the optical signals to electrical signals that are representative of the optical signals. The electrical signals may then be communicated along one or more of the electrical traces to one or more of the contacts on the PCB 108. The electrical signals may then be communicated to one or more of the pins 102.

The optical components configured to receive optical signals and/or convert the optical signals to electrical signals may include, but are not limited to, optical receivers such as PIN photodiodes, trans-impedance amplifiers, some combination thereof, or one or more other optical components capable of receiving optical signals and generating representative electrical signals therefrom.

In the depicted embodiment, a lateral dimension of the optical fibers 104, which is herein defined as a lengthwise dimension represented in FIG. 1B by arrow 120, is substantially oriented parallel to a lateral dimension of the pins 102, which is herein defined as a lengthwise dimension represented in FIG. 1B by arrow 122. In particular, the lateral dimensions of the optical fibers 104 and the pins 102 are substantially parallel to the XY plane in an arbitrarily-defined coordinate system.

In some alternative embodiments, the lateral dimensions of the optical fibers 104 may be oriented substantially normal to the lateral dimension of the pins 102. For example, the lateral dimension of the pins 102 may be parallel to the YZ plane and the lateral dimension of the optical fibers 104 may be oriented substantially parallel to the YZ plane. In these and other alternative embodiments, the electrical trace on the PCB 108 may have different designs, but otherwise, the functions of the connector 100 and/or the optical components may be similar.

In the connector 100, the optical fibers 104 may be secured to the lens assembly 110. Following securing the optical fibers 104 to the lens assembly 110, the optical fibers 104 may be aligned with the optical components mounted to the PCB 108 such that optical signals may be communicated between the optical fibers 104 and the optical components. The process of securing the optical fibers 104 to the lens assembly 110 and/or the process of aligning the optical fibers 104 with the optical components may be based on the quality and nature of the optical components, the orientation of the optical components on the PCB 108, the position of the optical fibers on the lens assembly 110, or some combination thereof.

Accordingly, some embodiments described herein may benefit from designing features of the connector 100 to increase alignment and/or securing tolerances of the optical fibers 104 and the optical components. When the alignment and/or securing tolerances of the connector 100 are increased, alignment of the optical fibers 104 with the optical components may become easier and the cost of the connector 100 may be generally lower than in embodiments with tighter tolerances. Additionally or alternatively, when the alignment and/or securing tolerances of the connector 100 are increased, the quality of the optical components may be lower than in embodiments with tighter tolerances. In some embodiments of the connector 100, at least one of the optical components is a single channel VCSEL. The single channel VCSEL may additionally be a scrap VCSEL, which are generally inexpensive when compared to other VCSELs.

Figure 2A:
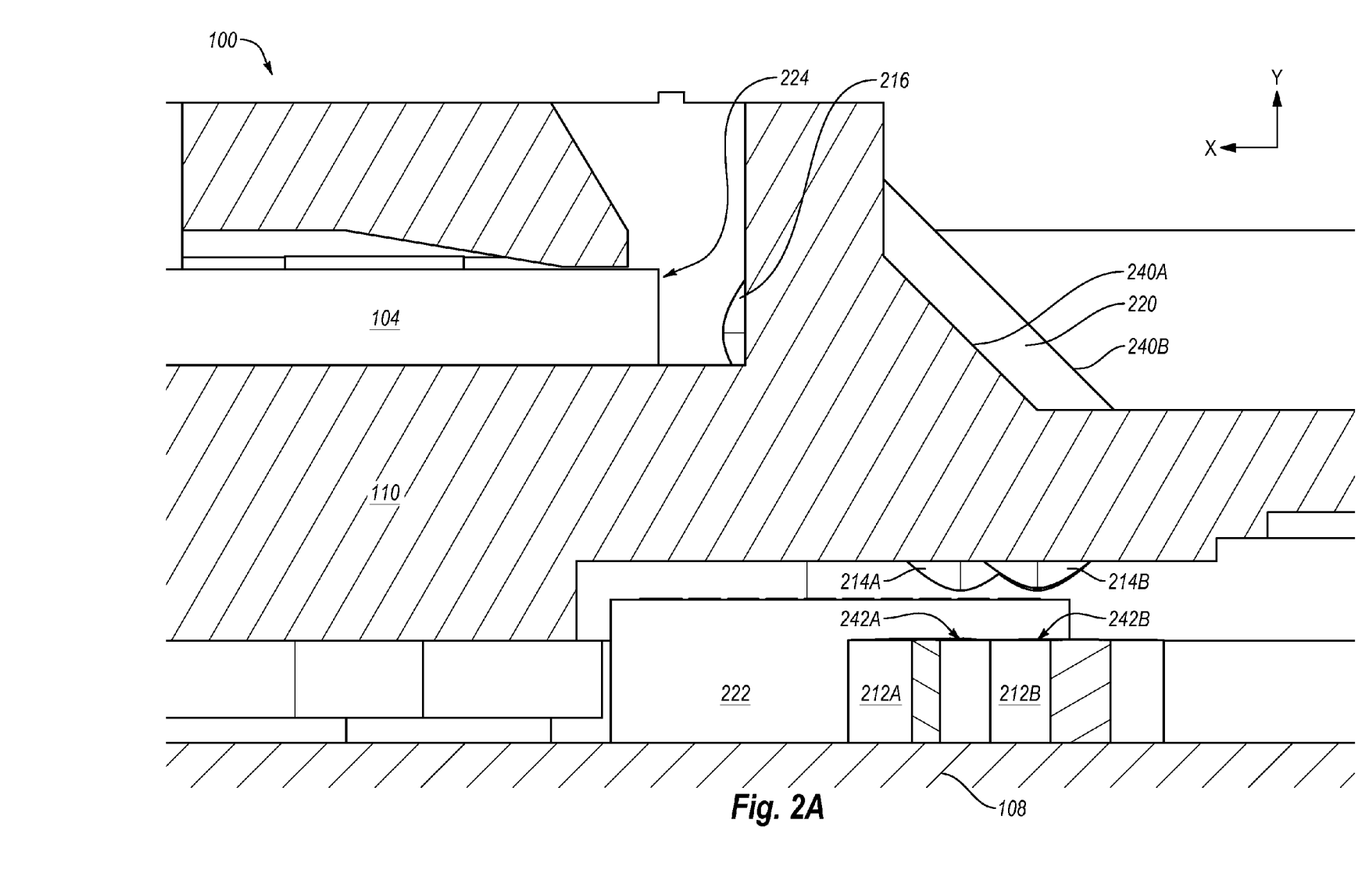
FIGS. 2A and 2B illustrate partial sectional views of the optical connector of FIGS. 1A and 1B.
Figure 2B:
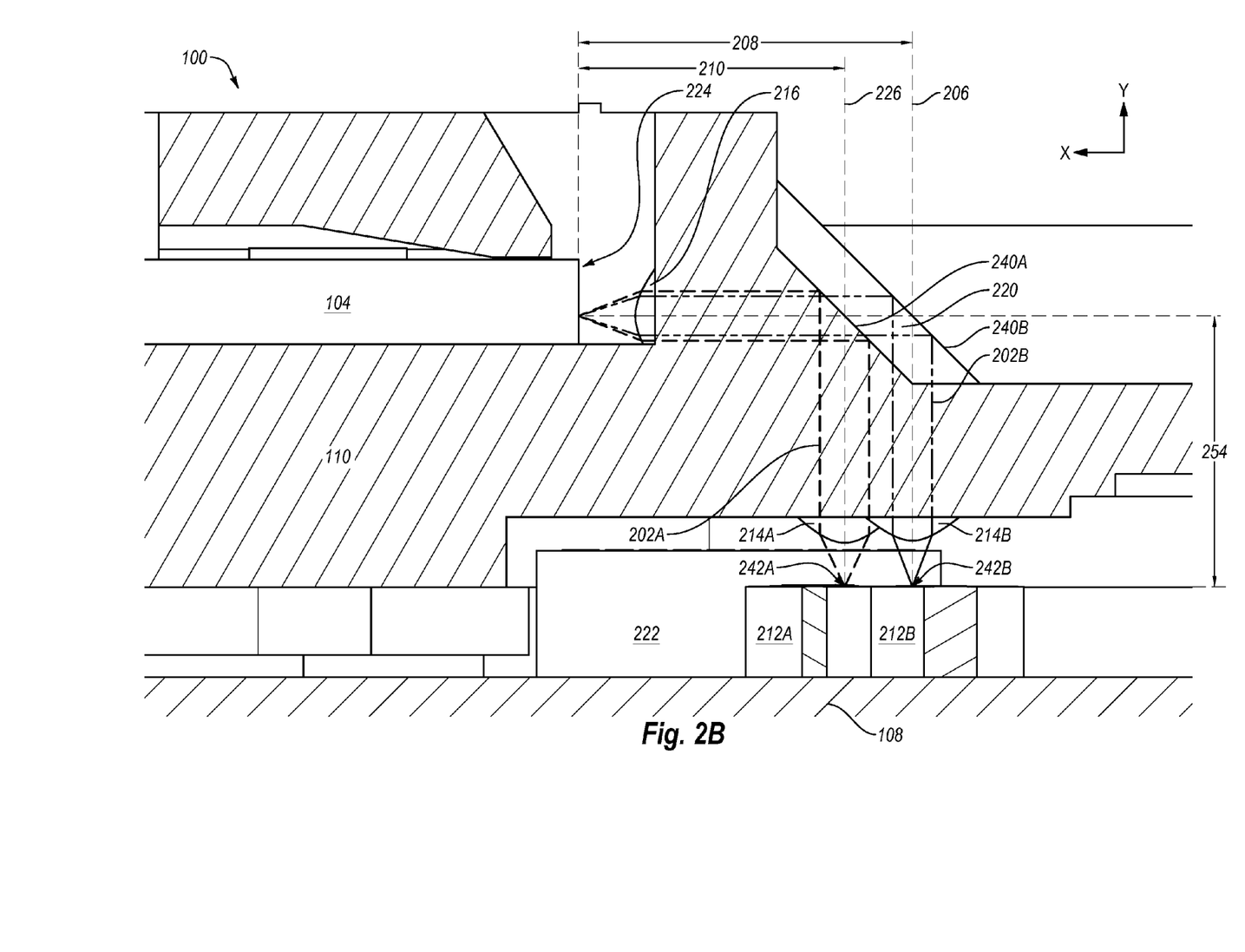

An example feature of the connector 100 that may increase alignment tolerances may include positioning of the optical components with respect to the optical fibers 104. For example, FIGS. 2A and 2B illustrate sectional views of the connector 100 of FIGS. 1A and 1B depicting such positioning. Specifically, FIGS. 2A and 2B illustrate a side-sectional view of a portion of the connector 100 of FIGS. 1A and 1B. FIGS. 2A and 2B include multiple components (e.g., 104, 110, and 108) described above with reference to FIGS. 1A and 1B. Some details of these components are not repeated.

With specific reference to FIG. 2A, some of the components that may be implemented to communicate data in a connector are described. Generally, data in the form of optical signals may be communicated between the optical fibers 104 and optical components 212A and 212B (generally, optical component or optical components 212). Examples of the optical components 212 include optical receivers and optical transmitters. As described above, optical signals may enter the lens assembly 110 via the optical fibers 104 and may be communicated to an optical receiver (e.g., optical component 212A). Additionally or alternatively, an optical transmitter (e.g., optical component 212B) may generate optical signals, which may then be communicated to the optical fibers 104.

In the sectional view of FIGS. 2A and 2B, only one of the optical fibers 104 is visible. However, it should be appreciated with the benefit of this disclosure that multiple optical fibers 104 may be received by the lens assembly 110 and may be substantially aligned by the lens assembly 110. More specifically, the optical fibers 104 may be secured to the lens assembly 110 along the outer circumference of the optical fibers 104 such that one or more ends 224 of the optical fibers 104 are substantially aligned. In addition, the optical fibers 104 may be positioned with respect to the lens assembly 110 and one another such that the ends 224 are parallel to the YZ plane. Generally, optical signals enter and exit the optical fibers 104 through the ends 224.

The lens assembly 110 may include one or more focusing lenses 216. The focusing lenses 216 may be positioned across from each of the ends 224. As used with reference to the focusing lenses 216 and the optical fibers 104, the term "across" may be include being positioned to receive optical signals exiting one of the optical fibers 104 or being positioned to communicate optical signals to one of the optical fibers 104. With reference to the depicted embodiment, the term "across" includes displaced in substantially the negative X direction from the end 224 of one of the optical fibers 104. In FIGS. 2A and 2B only one of the focusing lenses 216 is visible. In this and other embodiments, the lens assembly 110 may include more than one focusing lens 216. In some embodiments, the focusing lenses 216 may be integrally formed in the lens assembly 110.

The lens assembly 110 may also include an angled surface 220. In some embodiments, the angled surface 220 may be offset from the focusing lenses 216 in the negative X direction. In addition, in these and other embodiments, between the focusing lenses 216 and the angled surface 220, the lens assembly 110 may be solid.

The angled surface 220 may be reflective or at least partially reflective. Thus, the angled surface 220 may redirect optical signals that impinge the angled surface 220. For example, optical signals exiting the optical fibers 104 travelling in the negative X direction may enter the focusing lenses 216, continue to travel in the negative X direction, impinge the angled surface 220, and be redirected in the negative Y direction.

The lens assembly 110 may also include one or more cavity lenses 214A and 214B (generally, cavity lens or cavity lenses 214). The cavity lenses 214 in FIGS. 2A and 2B are displaced in the Z direction and in the X direction from one another. One or more of the cavity lenses 214 may be positioned across from each of the optical components 212. As used with reference to the cavity lenses 214 and the optical components 212, the term "across" may include being positioned to receive optical signals exiting one of the optical components 212 or being positioned to communicate optical signals to one of the optical components 212. With reference to the depicted embodiment, the term "across" includes being displaced in the positive Y direction from one of the optical components 212. In FIGS. 2A and 2B only two of the cavity lenses 214 are visible. In this and other embodiments, the lens assembly 110 may include more than two cavity lenses 214. In some embodiments, the cavity lenses 214 may be integrally formed in the lens assembly 110.

In some embodiments, the angled surface 220 may include multiple facets 240A-240B (generally, facet or facets 240) that redirect the optical signals towards different cavity lenses 214 or receive optical signals from different optical components 212 via different cavity lenses 214. The facets 240 in FIGS. 2A and 2B are displaced in the Z direction. Additionally, a first facet 240A may be displaced in the negative X direction from a second facet 240B. Thus, optical signals exiting one of the optical fibers 104 may impinge the first facet 240A. The optical signals may be reflected towards a first cavity lens 214A. Additionally or alternatively, optical signals transmitted by the second optical component 212B may enter a second cavity lens 214B, impinge the second facet 240B and may be reflected towards one of the optical fibers 104.

The lens assembly 110 may define a cavity 222. The cavity 222 may be configured such that the optical components 212 may be positioned in the cavity 222 and mounted or otherwise mechanically secured to the PCB 108. Additionally, the cavity 222 may be configured such that each of the optical components 212 may be positioned across from one of the cavity lenses 214.

In some embodiments, the optical components 212 may be oriented such that apertures 242A and 242B (generally, aperture or apertures 242) of the optical components 212 are substantially aligned with the Y axis. Thus, optical signals traveling in the negative Y direction after being redirected by the angled surface 220 or the facet 240 thereof may be received by the optical components 212 or optical signals generated by the optical components 212 that are transmitted in the positive Y direction may travel through the cavity lenses 214 and towards the angled surface 220.

FIG. 2B illustrates example optical paths 202A and 202B (generally, path or paths 202), which extend from the optical components 212 through the lens assembly 110 to the optical fibers 104 and/or from the optical fibers 104 through the lens assembly 110 and to the optical components 212. The paths 202 include a vertical path length between the optical components 212 and the angled surface 220 or the facet 240 thereof and a horizontal path length between the angled surface 220 or the facet 240 thereof and the optical fibers 104.

In some embodiments, the vertical path length of the paths 202 may be substantially normal to the horizontal path length. Thus, the angled surface 220 may be angled at about a 45-degree angle with respect to the Y axis. In alternative embodiments, the vertical path length may be oriented at greater than or less than a 90-degree angle to the horizontal path length. Accordingly, in these alternative embodiments, the angled surface 220 may be angled at an angle greater than or less than 45 degrees with respect to the Y axis.

The optical signals may travel in either direction along the paths 202. For example, in embodiments in which the optical components 212 are VCSELs, optical signals may be generated by the VCSELs. The optical signals may be transmitted towards the angled surface 220 (e.g., in the positive Y direction). The optical signals may reflect from the angled surface 220, being redirected to travel towards the end 224 of one of the optical fibers 104 (e.g., in the positive X direction), and may then enter the optical fibers 104. Alternatively, in embodiments in which the optical components 212 are PIN photodiodes or another optical receiver, optical signals may travel from the ends 224 of the optical fibers 104 towards the angled surface 220 (e.g., in the negative X direction). The optical signals may be reflected by the angled surface 220, being redirected towards the PIN photodiode (e.g., in the negative Y direction). The optical signal may then be received by the PIN photodiode.

As shown in FIG. 2B, the ends 224 of the optical fibers 104 may be substantially aligned. The ends 224 of the optical fibers 104 are represented by an optical fiber end plane (end plane) 204 in FIG. 2B that is substantially parallel to the YZ plane. The optical components 212 may not be aligned in a single plane. Instead, the first optical component 212A may be positioned in a first plane represented in FIG. 2B by 204 and the second optical component 212B may be positioned in a second plane represented by 206. It will be appreciated with the benefit of this disclosure that more than one optical component 212 may be aligned in a first plane 226 and/or the second plane 206.

In this and other embodiments, a first distance 210 from the end plane 204 to the first plane 226, which may correspond to a horizontal path length of a first optical path 202A, may be shorter than a second distance 208 from the end plane 204 to the second plane 206, which may correspond to a horizontal path length of a second optical path 202B.

Generally, a difference between the first distance 210 and the second distance 208 may introduce design and alignment difficulties. Specifically, the greater the difference between the first distance 210 and the second distance 208, the greater a variation in locations in which the optical paths 202 may enter the optical fibers 104 or the greater the variation in locations at which the optical paths may exit the optical fibers 104 to effectively communicate the optical signals to one of the optical components 212. Moreover, communication of optical signals may benefit from the optical paths 202 being centered or substantially centered with respect to the ends 224 of the optical fibers 104.

In this and other embodiments, to minimize the difference between the first distance 210 and the second distance 208, the apertures 242 of the optical components 212 may be substantially aligned or at least aligned to minimize the difference. Some additional details of the alignment of the optical components 212 are discussed with reference to FIG. 2C.

Additionally, as illustrated in FIG. 2B, the facets 240 of the angled surface 220, which are displaced from one another in the Z direction and the X direction, may help align the optical paths 202. Specifically, the second facet 240B may be farther in the X direction from the ends 224 of the optical fibers 104 than the first facet 240A. Correspondingly, the second optical component 212B may be positioned farther from the ends 224 of the optical fibers 104 than the first optical component 212A. The displacement in the X direction of the facets 240 compensates, at least partially, for the difference between the first distance 210 and the second distance 208. Accordingly, the second optical path 202B may have a larger horizontal path length than the first optical path 202A, but the vertical path lengths, which are represented in FIG. 2B by a length 254, of the first optical path 202A and the second optical path 202B may be about equal. In this and other embodiments, the vertical path lengths may determine locations at which the optical paths 202 enter (or exit) the ends 224 of the optical fibers 104. In some embodiments, there may still be a difference in locations at which the optical paths 202 enter the ends 224 of the optical fibers 104. The difference in the locations at which the optical paths 202 enter the optical fibers 104 represented in FIG. 2B may be exaggerated.

Figure 2C:
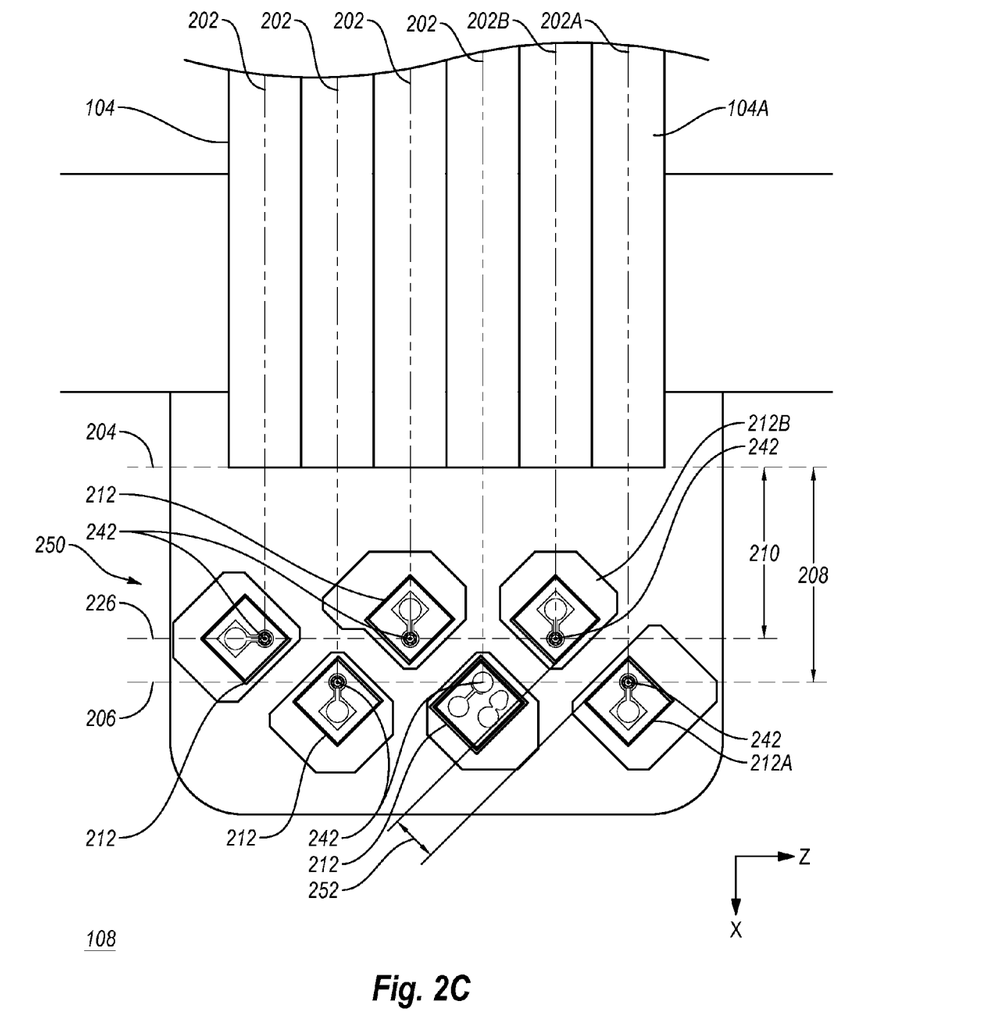
FIG. 2C illustrates a top view of example optical components arranged in the optical connector of FIGS. 1A and 1B.

As discussed above, the greater the difference between the first distance 210 and the second distance 208, the lower the tolerance there is during the alignment of the optical fibers 104 with the optical components 212. Therefore, aligning the apertures 242 of the optical components 212 in the YZ plane and/or minimizing the difference between the first distance 210 and the second distance 208 may result in multiple advantages during alignment and communication of optical signals. FIG. 2C illustrates a top view of the optical components 212 described with reference to FIGS. 2A and 2B arranged in an array 250. The array 250 may be implemented in the connector 100 of FIGS. 1A and 1B, for instance. Specifically, FIG. 2C is a top view of the PCB 108 including the optical components 212 and the optical fibers 104. In FIG. 2C, the X dimension may correspond to a lateral dimension (e.g., 120 of FIG. 1B) of the optical fibers 104. Additionally, in FIG. 2C, six optical fibers 104 are visible and six optical components 212 are visible, but the lens assembly 110 of FIGS. 1B-2B is omitted.

The array 250 depicted in FIG. 2C refers to the relative positions of the optical components 212 mounted or otherwise mechanically coupled to the PCB 108. The configuration of the array 250 may be determined by a variety of factors. For example, each of the optical components 212 may correspond to one of the optical fibers 104. That is, one of the optical components 212 receives or transmits optical signals via one of the optical fibers 104. Accordingly, each of the optical components 212 may be positioned on the PCB 108 to align with the corresponding optical fibers 104 in the X direction. For example, the first optical component 212A is positioned on the PCB 108 to align with a first optical fiber 104A.

Additionally, the optical components 212 may be staggered and offset from one another. The staggering and offsetting the optical components 212 may better utilize space limitations on the PCB 108 in the Z direction. Staggering and offsetting the optical components 212 may also allow some overlap of the Z dimensions of the optical components 212. For example, the first optical component 212A is offset and separated from the second optical component 212B by a separation distance 252.

Additionally still, as discussed with reference to FIGS. 2A and 2B, minimizing the difference between the first distance 210 and the second distance 208 may result in some functional benefits. Thus, the array 250 minimizes the difference by rotationally orienting the optical components 212 at an angle with respect to the X direction.

For example, in the depicted embodiment, each of the optical components 212 is essentially a cube with a rectangular top surface. The rectangular top surfaces of the optical components 212 are visible in FIG. 2C. Each of the optical components 212 includes the apertures 242 positioned on the rectangular top surface. The apertures 242 are generally positioned in one corner of the rectangular top surface. To minimize the difference between the first distance 210 and the second distance 208, the corners of the optical components 212 that include the apertures 242 may be substantially aligned in two planes (e.g., 226 and 206) parallel to the YZ plane. To decrease the difference between the first distance 210 and the second distance 208, the corners including the apertures, which are aligned, may be positioned nearest one another.

More specifically, in the depicted embodiment, a first subset of the optical components 212 may be aligned along the first plane 226 and a second subset of the optical components 212 may be aligned along the second plane 206. The corners including the apertures 242 in the first subset may be positioned nearest the corners including the apertures 242 in the second subset. Thus, the corners including the apertures 242 in the first subset may be positioned to have a large X coordinate and the corners including the apertures 242 in the second subset may be positioned to have a low X coordinate.

In this and other embodiments, the optical components 212 in each of the first and second subsets may be rotationally oriented to minimize the distance between the first plane 226 and the second plane 206. For example, the optical components 212 may be oriented at about a 45-degree angle with respect to the X direction. By rotationally orienting the optical components 212 in this way, the difference between the first distance 210 and the second distance 208 may be minimized or eliminated. In addition, the limited space on the PCB 108 in the Z direction may be well utilized.

Figure 3A:
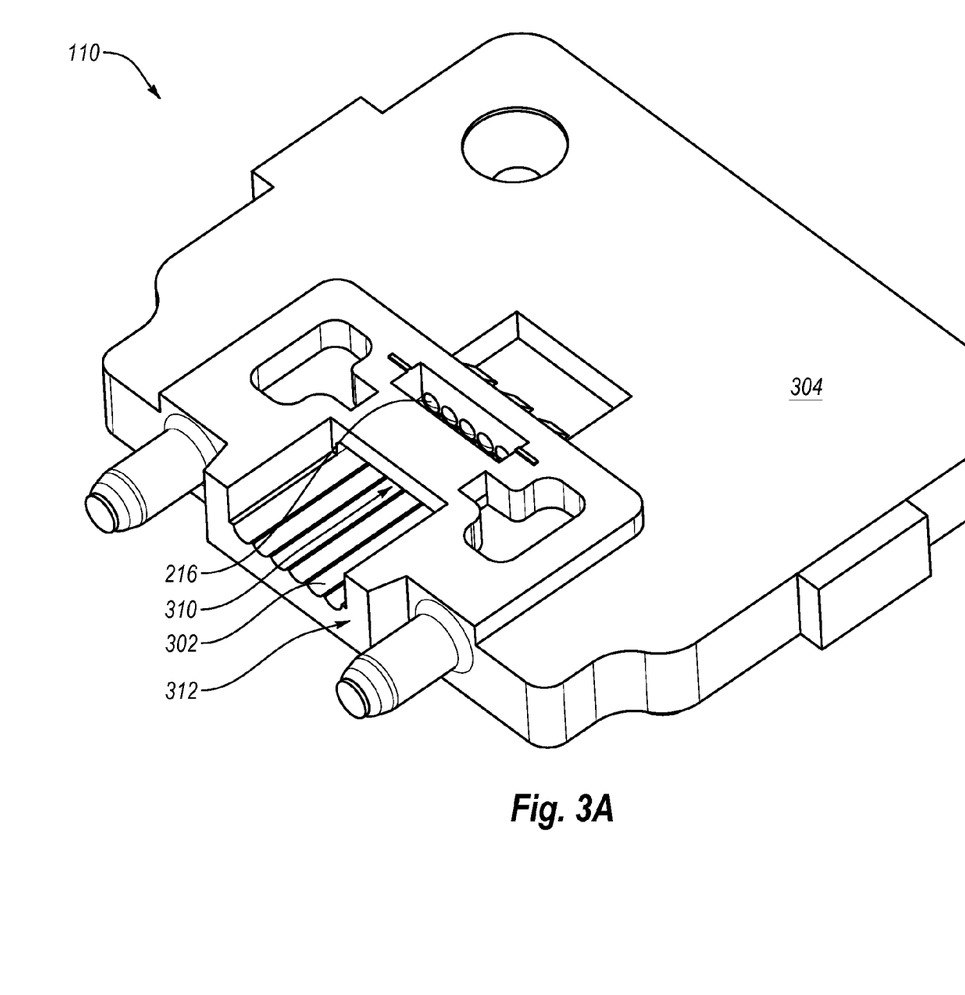
FIGS. 3A and 3B illustrate an example lens assembly that may be implemented in the optical connector of FIGS. 1A and 1B.
Figure 3B:
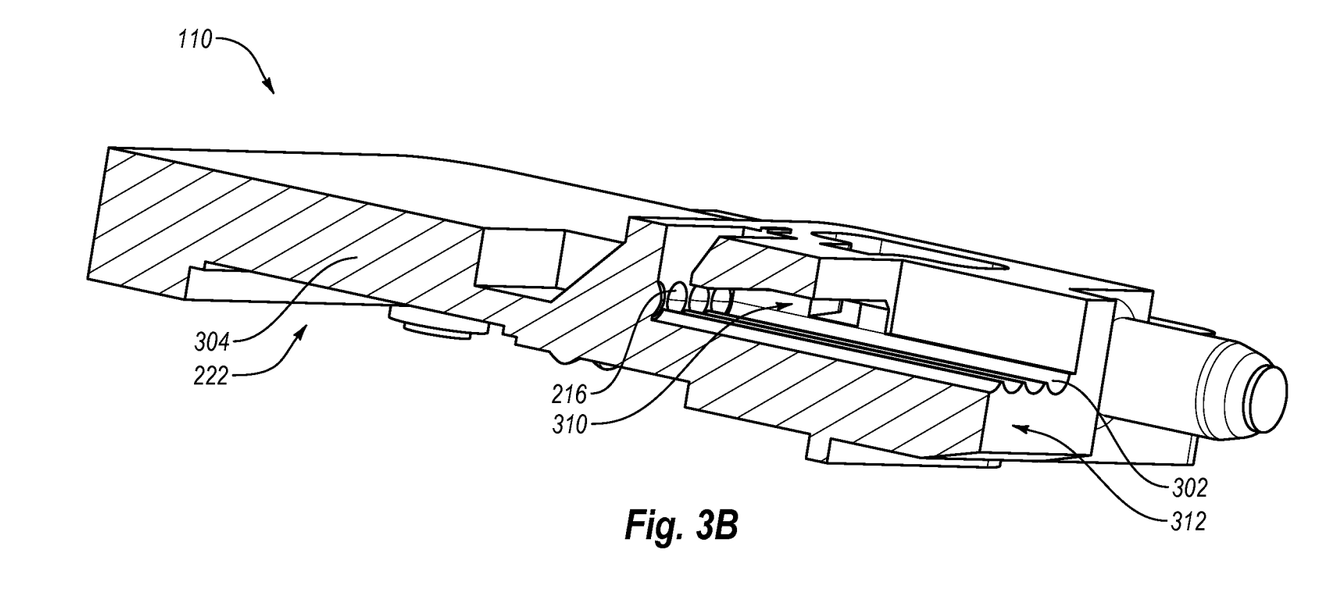

FIGS. 3A and 3B illustrate an example embodiment of the lens assembly 110 of FIGS. 1B-2B. FIG. 3A depicts a rear perspective view of the lens assembly 110 and FIG. 3B depicts a sectional perspective view of the lens assembly 110.

The lens assembly 110 may include a lens body 304. The lens body 304 may define the cavity 222 (FIG. 3B only) and an optical fiber seat 302. The cavity 222 may be defined to enable positioning of an array of optical components therein. For example, as depicted in FIGS. 2A and 2B, the lens body 304 defines the cavity 222 in which the optical components 212A and 212B are positioned. When positioned in the cavity 222, the cavity lenses 214 may be aligned with the apertures (e.g., the apertures 242) of the optical components 212.

Referring back to FIGS. 3A and 3B, the optical fiber seat 302 may be configured to receive at least some portion of optical fibers. When optical fibers are positioned in the optical fiber seat 302, optical signals may be communicated from optical components positioned in the cavity 222. Additionally, optical signals communicated along the optical fiber may be communicated to the optical components positioned in the cavity 222. The optical fiber seat 302 may be shaped to position the optical fibers 104 such that optical fiber ends may be substantially aligned with or across from one of the focusing lenses 216. For example, with combined reference to FIGS. 2A, 3A, and 3B, the optical fiber seat 302 may be configured to receive the optical fibers 104. When received in the optical fiber seat 302, each of the optical fibers 104 may be substantially aligned with one of the focusing lenses 216.

Referring back to FIGS. 3A and 3B, the optical fiber seat 302 may be located at least partially within an enclosure 310. In some embodiments, the optical fiber seat 302 may run from an edge 312 of the lens assembly 110, through the enclosure 310, to the focusing lenses 216. Alternately, the optical fiber seat 302 may start away from the edge 312 of the lens assembly 110, and/or may end at another position, such as the desired position of the ends of optical fibers positioned in the optical fiber seat 302. The optical fiber seat 302 may include curved receiving surfaces. The curved receiving surfaces may be U-shaped, arc-shaped, semicircle-shaped, or the like. Alternately or additionally, the optical fiber seat 302 may be V-shaped, and/or may include a combination of flat, respectively angled surfaces.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical connector comprising:
   a printed circuit board (PCB);
   a plurality of optical components mounted to the PCB, wherein:
      each of the plurality of optical components includes a top surface that includes one or more corners and an aperture positioned in one of the corners,
      a first subset of the plurality of optical components is mounted to the PCB such that the apertures of the first subset of optical components are substantially aligned in a first plane,
      a second subset of the plurality of optical components is mounted to the PCB such that the apertures of the second subset of optical components are substantially aligned in a second plane that is substantially parallel to the first plane, and
      the first subset of optical components is rotationally-oriented with respect to the second subset of optical components such that the corners in which the apertures are positioned are nearest to one another;
   a lens assembly positioned on the PCB, wherein:
      the lens assembly defines a cavity in which the plurality of optical components are positioned and an optical fiber seat configured to receive a plurality of optical fibers, and
      the lens assembly includes an angled surface configured to redirect optical signals between the plurality of optical components and the plurality of optical fibers received in the optical fiber seat.

2. The optical connector of claim 1, wherein the lens assembly is configured such that when the plurality of optical fibers is received in the optical fiber seat,
   ends of the plurality of optical fibers are substantially aligned in a third plane substantially parallel to the first plane and the second plane.

3. The optical connector of claim 1, wherein:
   the angled surface includes a first facet and a second facet;
   the first facet is positioned to reflect a first optical signal from a first optical component of the first subset of optical components to a first of the plurality of optical fibers received in the optical fiber seat; and
   the second facet is positioned to reflect a second optical signal from a second optical component of the second subset of optical components to a second of the plurality of optical fibers received in the optical fiber seat.

4. The optical connector of claim 1, wherein
   the top surface of each of the plurality of optical components is rectangular.

5. The optical connector of claim 4, wherein:
   the lens assembly is configured such that when the plurality of optical fibers is received in the optical fiber seat, the plurality of optical fibers are oriented to have a common lateral dimension; and
   the first subset of optical components and the second subset of optical components are rotationally oriented at about 45 degrees with respect to the orientation of the common lateral dimension.

6. The optical connector of claim 1, wherein the plurality of optical components include at least one single channel vertical-cavity surface-emitting laser (VCSEL).

7. The optical connector of claim 1, wherein the plurality of optical components include at least one PIN diode.

8. The optical connector of claim 1, wherein the lens assembly further includes a lens body that defines the cavity and the optical fiber seat.

9. The optical connector of claim 8, further comprising:
   a cavity lens positioned on the lens body; and
   a focusing lens positioned on the lens body.

10. The optical connector of claim 9, wherein the angled surface is positioned between the focusing lens and the cavity lens, the angled surface is configured to redirect optical signals entering the lens body from the cavity lens to the focusing lens or to redirect optical signals entering the lens body from the focusing lens to the cavity lens.

11. The optical connector of claim 10, wherein one or both of the cavity lens and the focusing lens are integrally formed with the lens body.

12. The optical connector of claim 8, wherein:
   the top surface of each of the plurality of optical components is a rectangular top surface;
   the aperture of each of the plurality of optical components is positioned in a corner of the rectangular top surface;
   the lens body is configured such that when the optical components are positioned in the cavity and the optical fibers are received in the optical fiber seat, the rectangular top surface of each of the optical components is substantially normal to an end of the optical fibers; and the angled surface is angled at about a 45-degree angle with respect to the rectangular top surface of the optical component and the end of the optical fibers.

13. The optical connector of claim 1, wherein:
the angled surface includes a first facet and a second facet, wherein the first facet is displaced from a second facet;
the first facet is configured to redirect optical signals from a first of the plurality of optical components positioned in the cavity to a first of the plurality of optical fibers received in the optical fiber seat; and
the second facet configured to redirect optical signals from a second of the plurality of optical components positioned in the cavity to a second of the plurality of optical fibers received in the optical fiber seat.

14. The optical connector of claim 13, further comprising:
a first cavity lens positioned to receive optical signals from the first of the plurality of optical components positioned in the cavity; and
a second cavity lens positioned to receive optical signals from the second of the plurality of optical components positioned in the cavity.

15. An optical connector comprising:
a printed circuit board (PCB);
one or more single channel vertical-cavity surface-emitting lasers (VCSELs) mounted to the PCB, wherein each of the VCSELs is configured to transmit optical signals through an aperture that is positioned at a corner of a top surface of the VCSEL and the apertures of the VCSELs are substantially aligned in a first plane;
one or more PIN diodes mounted to the PCB, wherein each of the PIN diodes is configured to receive optical signals through an aperture that is positioned at a corner of a top surface of the PIN diode and the apertures of the PIN diodes are substantially aligned in a second plane that is substantially parallel to the first plane and are rotationally-oriented with respect to the VCSELs such that corners in which the apertures are positioned are nearest to one another; and
a lens assembly positioned on the PCB, wherein:
the lens assembly defines a cavity in which the VCSELs and the PIN diodes are positioned and an optical fiber seat configured to receive one or more optical fibers, and
the lens assembly includes an angled surface configured to reflect the optical signals transmitted by the VCSELs to a first subset of the optical fibers received in the optical fiber seat and to reflect the optical signals communicated along a second subset of the optical fibers received in the optical fiber seat to the PIN diodes.

16. The optical connector of claim 15, wherein:
the VCSELs and the PIN diodes are staggered and offset from one another; and
the VCSELs and the PIN diodes are rotationally-oriented at about 45 degrees with respect to a lateral dimension of the optical fibers received in the optical fiber seat.

17. The optical connector of claim 16, wherein the lens assembly is configured such that when the optical fibers are received in the optical fiber seat, the ends of the optical fibers are substantially aligned along a plane that is substantially parallel to the two parallel planes.

18. The optical connector of claim 15, wherein:
the angled surface includes a first facet and a second facet, the first facet being configured to reflect a first optical signal from the first VCSEL to a first optical fiber received in the optical fiber seat, and the second facet being configured to reflect a second optical signal from the second VCSEL to a second optical fiber received in the optical fiber seat; and
the first facet is displaced from the second facet to at least partially compensate for the distance between the first plane and the second plane.

19. An optical connector comprising:
a printed circuit board (PCB);
a first optical component mounted to the PCB that includes a first aperture that is positioned in a corner of a top surface of the first optical component;
a second optical component mounted to the PCB that includes a second aperture that is positioned in a corner of a top surface of the second optical component; and
a lens assembly positioned on the PCB that defines an optical fiber seat configured to receive one or more optical fibers and that redirects optical signals between the first and the second optical components and the optical fibers,
wherein:
the first aperture is aligned in a first plane;
the second aperture is aligned in a second plane that is substantially parallel to and displaced from the first plane;
when the optical fibers are received in the optical fiber seat, ends of the optical fibers are substantially aligned in a third plane that is substantially parallel to and displaced from the first and second planes,
the first optical components is staggered and offset from the second optical component;
the first optical components is rotationally-oriented with respect to the second optical components such that the corners in which the apertures are positioned are nearest to one another; and
the first optical components and the second optical components are rotationally-oriented at about 45 degrees with respect to a lateral dimension of the optical fibers received in the optical fiber seat.

20. The optical connector of claim 19, wherein the lens assembly includes a focusing lens integrally formed into the lens assembly, a cavity lens integrally formed into the lens assembly, and an angled surface positioned between the focusing lens and the cavity lens, wherein the angled surface is configured to redirect optical signals between the first or the second optical components and the optical fibers received in the optical fiber seat through the focusing lens and the cavity lens.

* * * * *